M. J. INGLE.
CARBONATED ICE CREAM AND PROCESS OF MAKING THE SAME.
APPLICATION FILED OCT. 4, 1919.
1,397,168.  Patented Nov. 15, 1921.
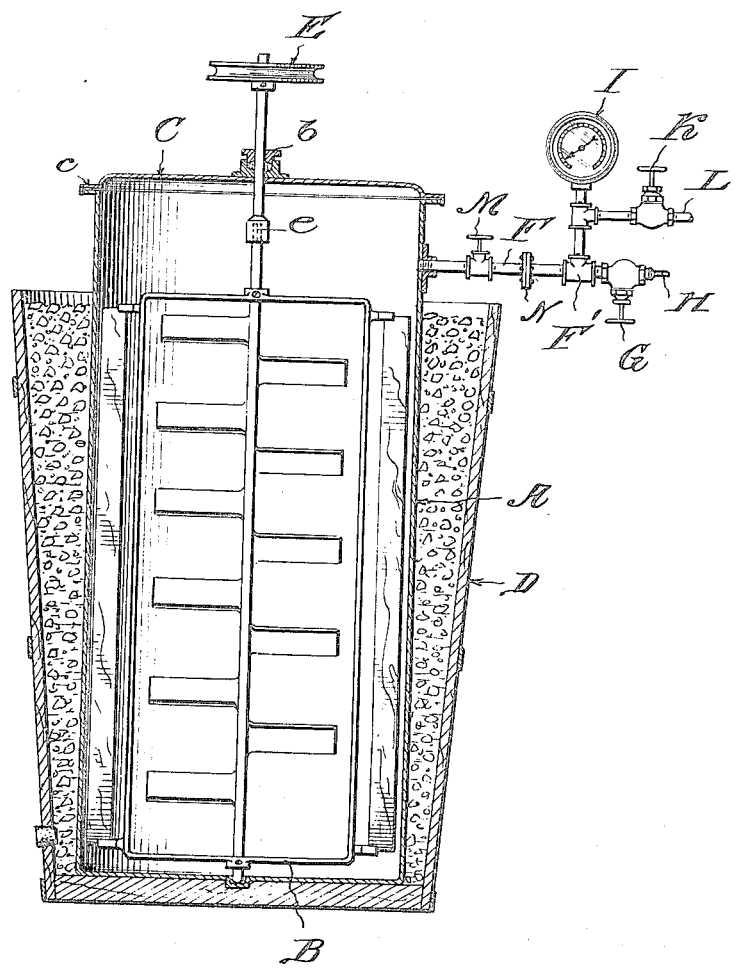

UNITED STATES PATENT OFFICE.

MARK J. INGLE, OF WASHINGTON, DISTRICT OF COLUMBIA.

CARBONATED ICE-CREAM AND PROCESS OF MAKING THE SAME.

1,397,168. Specification of Letters Patent. Patented Nov. 15, 1921.

Application filed October 4, 1919. Serial No. 328,550.

*To all whom it may concern:*

Be it known that I, MARK J. INGLE, a citizen of the United States, residing at Washington, District of Columbia, have invented certain new and useful Improvements in Carbonated Ice-Cream and Processes of Making the Same, of which the following is a specification.

The object of my invention is the production of an aerated dessert ice, or more specifically a carbonated ice cream and a process of making the same. The product obtained by my process has a greater porosity or lightness than the ordinary dessert ice, and further, does not become rancid as rapidly as the ordinary variety.

The above mentioned properties may be obtained by the use of any inert gas, as nitrogen, carbon dioxid, and also, though to a less degree, by the use of air, preferably purified. By the use of one of the above named gases, a further attractiveness is added to the dessert ice by increasing the volatility of the fruit aromas, which gives a pleasant odor to the dessert cream.

In the preferred form of my invention, I use carbon dioxid or carbonic acid gas as a gas medium which gives to the dessert cream, besides the above mentioned properties, an improved taste, such as is imparted by its use to a carbonated beverage by adding so-called zest or life thereto.

The cream or dessert ice made by my process may be used particularly for ice cream sodas as a gas carrying cream, whereby the use of a carbonated liquid as an ingredient in such sodas may be avoided, and is of substantial value in this connection.

The term dessert ice is used in this specification and in the claim as a generic term which includes ice cream as well as water ices, etc.

The form of apparatus in which my process may be carried out is illustrated in the accompanying drawing in which the figure is a vertical section of the preferred form.

In carrying out the process the following procedure is preferably followed:

The ingredients are prepared and mixed in the usual way and placed in the inner can or receiver A. If desired, a gelatin, saponin, gum, or other thickening agent may be added to the mixture to assist in emulsifying or holding the gas particles. A beater or paddle dasher B, which passes through a stuffing-box $b$, is then inserted in the can and a cover C is attached. If desired, for convenience in operation, the beater rod may be detachable from the shaft of the driving mechanism by the use of a joint $e$, as shown.

Between the cover C and the flanged rim of the can A may be placed a rubber gasket to secure an air-tight joint at this place. The can A is then inserted in the vessel or freezer tub D, and the driving mechanism E and pipe connections between the pipes H and L leading to the suction and gas supply pipes, respectively, are attached in the usual manner. By opening the valve G to the suction pipe H the air is withdrawn from the can A, and the contents are cooled more or less by the consequent evaporation of a part of the liquid therein. While the air is being removed, the freezing mixture, preferably of ice and salt, may be placed around the can A in the vessel D, and the stirring mechanism set in motion. A vacuum and pressure gage I, attached at the pipe connection F' to the pipe F, may be used to indicate the pressure in the can A. When the gage or indicator has become practically constant, or registers the desired vacuum, the valve G leading to the suction pipe H is closed, and the valve K, leading to the gas medium pipe L, is opened to admit carbon dioxid or other gas with which the cream is to be impregnated.

While in the form of construction shown the carbon dioxid or other gas is admitted through the same pipe connection F' as is used for withdrawing air from the can A, it is to be understood that the gas may be admitted through connections to the bottom of the can, or, if desired, through a hollow beater to perforations in the same, to assist in stirring or to aid in the dissemination of the gas bubbles through the mixture to be frozen. If the latter construction is used, both the freezer can A and the stirring device B may be rotated, the rotation being in opposite directions, as in the modern ice cream freezer construction. In the form of construction shown, however, only the stirrer or beater is allowed to rotate.

The carbon dioxid or other gas is admitted until the desired pressure is obtained in the apparatus, the gas supply being then cut off by closing the valve K in the pipe L. If preferred, the connection with the gas supply pipe may be maintained until the end of the freezing operation. After the mixture has been frozen, the valve K, if not previously closed, is turned off and the rotation of the beater is stopped. The mixture may be allowed to remain under pressure in the freezer until required for use, or, if desired, the mixture may be subjected to a subsequent evacuation or suction to permit expansion of the gas and so increase the lightness of the material before use.

For convenience in handling the freezer can, a pipe coupling or joint N may be used in the pipe F, together with a valve M, by means of which pressure or vacuum may be maintained in the freezer can after it is disconnected from the gas or suction pipe system.

It is to be understood in the application of my invention that I do not limit myself to the use of any specific ingredients for cream or dessert ice to which carbon dioxid or other gas is to be applied. If a high grade cream is used the butter fats contained therein will serve to give the desired body to the material to retain the carbon dioxid or other gas in suspension. If a poor grade of cream or other substitute, as is frequently employed in commercial practice, is used, a gelatin, gum, or other thickening body is required to enable the mixture to properly hold the gas in emulsified or suspended condition after freezing. Such a carbonated dessert ice has the distinct advantage over a carbonated beverage in retaining the gas for a much longer period by emulsifying or holding captive the same by means of the solid cream particles. As heretofore mentioned a carbonated cream is of substantial value for use in ice cream sodas, and may be employed in this connection either with or without the use of carbonated liquids.

I claim:

A process for making an aerated dessert ice from an appropriate mixture, said process comprising first, evacuation of air from the mixture; second, passing an inert gas under pressure into the mixture; third, freezing the mixture and maintaining the material and gas under pressure during the freezing operation; and fourth, reducing the pressure to below atmospheric pressure after freezing to increase lightness of the material.

In testimony whereof I affix my signature.

MARK J. INGLE.